: US 9,647,892 B2

(12) United States Patent
Horman (10) Patent No.: US 9,647,892 B2
(45) Date of Patent: May 9, 2017

(54) CLOUD-BASED SERVICE RESOURCE PROVISIONING BASED ON NETWORK CHARACTERISTICS

(71) Applicant: Red Hat, Inc., Raleigh, NC (US)

(72) Inventor: Neil Horman, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 151 days.

(21) Appl. No.: 14/149,615

(22) Filed: Jan. 7, 2014

(65) Prior Publication Data

US 2015/0195138 A1    Jul. 9, 2015

(51) Int. Cl.
*H04L 12/24* (2006.01)
*H04L 12/917* (2013.01)
*H04L 12/911* (2013.01)

(52) U.S. Cl.
CPC .......... *H04L 41/0893* (2013.01); *H04L 47/72* (2013.01); *H04L 47/76* (2013.01)

(58) Field of Classification Search
None
See application file for complete search history.

(56) References Cited

U.S. PATENT DOCUMENTS

| 7,478,148 | B2 | 1/2009 | Neerdaels |
| 7,584,262 | B1 * | 9/2009 | Wang ................. H04L 12/4625 709/217 |
| 8,209,415 | B2 | 6/2012 | Wei |
| 8,429,630 | B2 | 4/2013 | Nickolov et al. |
| 8,438,240 | B2 | 5/2013 | Prince et al. |
| 8,761,101 | B1 * | 6/2014 | Crosbie ................. H04W 4/005 370/230 |
| 2009/0089438 | A1 | 4/2009 | Agarwal et al. |
| 2010/0223378 | A1 * | 9/2010 | Wei ..................... H04L 41/0896 709/224 |
| 2012/0124199 | A1 * | 5/2012 | Mahesh ................ G06F 3/0613 709/224 |
| 2012/0147894 | A1 * | 6/2012 | Mulligan ............ G06F 9/45533 370/395.53 |
| 2013/0151680 | A1 | 6/2013 | Salinas et al. |

OTHER PUBLICATIONS

Vaquero, et al., "Dynamically Scaling Applications in the Cloud," ACM SIGCOMM Computer Communication Review, vol. 41, No. 1, Jan. 2011, pp. 45-52.
Calder, et al., "Windows Azure Storage: A Highly Available Cloud Storage Service with Strong Consistency," Microsoft, SOSP '11, Oct. 23-26, 2011, Cascais, Portugal, pp. 143-157.
Buyya, et al., "Cloud Computing and Emerging IT Platforms: Vision, Hype, and Reality for Delivering Computing as the 5th Utility," Future Generation Computer Systems (2009), doi: 10.1016/j.future.20008.12.001, Dec. 3, 2008, 18 pages.

* cited by examiner

*Primary Examiner* — Angela Nguyen
(74) *Attorney, Agent, or Firm* — Lowenstein Sandler LLP (57) ABSTRACT

Provisioning a resource to provide a service based on network characteristics is disclosed. A request for a service may be received and network characteristics of current resources providing the service may be identified. If the network characteristics do not satisfy a load policy, a new resource is provisioned to provide the service. The location of the new resource may subsequently be transmitted. If the network characteristics do satisfy the load policy, then one of the current resources may be used to provide the service in response to the request.

19 Claims, 6 Drawing Sheets

CLOUD-BASED SERVICE RESOURCE PROVISIONING BASED ON NETWORK CHARACTERISTICS

TECHNICAL FIELD

Aspects of the disclosure relate generally to provisioning and, more specifically, relate to cloud-based service resource provisioning based on network characteristics.

BACKGROUND

A Domain Name System (DNS) server may be used to provide a hierarchical distributed naming system for computers, servers, services, or other such resources connected to a network (e.g., the Internet). For example, a DNS server may receive a request from a user that includes a domain name or host name of a server and the DNS server may translate the domain name of the server to a corresponding numerical Internet Protocol (IP) address that may be used by the user to locate the server via a network. For example, the DNS server may use a record (e.g., an A-type record) that associates a domain name to an IP address.

DNS servers may also utilize a service (SRV) record to define a location (e.g., IP address) of a service associated with a domain name. For example, a user may seek to access a database of a particular website associated with the domain name. The user may transmit a request to the DNS server that includes an identification of a database service and the domain name and the DNS server may provide a corresponding IP address that may be used to locate a corresponding database service at the corresponding IP address of the domain name. The user may then subsequently connect to the database service at the corresponding IP address.

As such, the DNS server may provide a keyword or domain name based redirection or relay service. Such a redirection or relay service may also apply to cloud computing systems or environments.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provision a resource to provide a cloud-based service in response to network characteristics. A cloud computing infrastructure or system may be a type of distributed computing system including multiple servers providing multiple services. Examples of services may include, but are not limited to, database services, access to an email server, access to a file server, web services, or any other network service.

Users of the cloud computing system may seek to access such services. For example, a user may transmit a request to access a database service at a domain name associated with the cloud computing system. The user's request may be received by a DNS server that may translate or map the requested service at the domain name to an IP address where the service may be provided to the user.

The DNS server may use stored records to translate a received domain name from a user request to an IP address or a received service and domain name to an IP address. For example, the DNS server may use a service (SRV) record to identify a location (e.g., IP address, host name and port number, etc.) of a server for the specified service. For example, a user may request a first type of service at a first domain name and the DNS server may use an SRV record to identify a location for a server associated with the domain name that provides the service to the user. The DNS server may further store multiple service records for a single type of service at the same domain name. In some embodiments, each of the service records would identify a separate location for a separate resource that provides the service. For example, a particular domain name may be associated with three databases and each of the three databases available at the domain name may be associated with separate service records at the DNS server. A user may request a database service at the domain name and the DNS server may use any of the service records for the database service at the domain name to provide a location for one of the servers that provides the service.

The DNS server may select a service record and subsequently a server location to transmit to a user in a round robin scheme. For example, if the DNS server has three service records for three different servers associated with a service at a domain name, the DNS server may relay back to requesting users the IP addresses of the servers in a round robin sequence. However, the round robin scheme used by the DNS server does not provide for dynamic provisioning of new servers in response to increase user access or load for a particular service at the cloud computing system associated with the domain name. For example, the DNS server may only identify a number of relayed user requests for each service record and thus each server, but may not identify a network load for each of the individual user requests.

Embodiment of the disclosure address the issue of provisioning new resources (e.g., servers) to provide a service at a cloud computing system by provisioning new resources or removing already provisioned resources based on network characteristics of the existing or currently provisioned resources providing the service. The present disclosure may monitor one or more network characteristics that the DNS server may not be able to identify and may subsequently provision new resources based on the monitored network characteristics.

Figure 1:
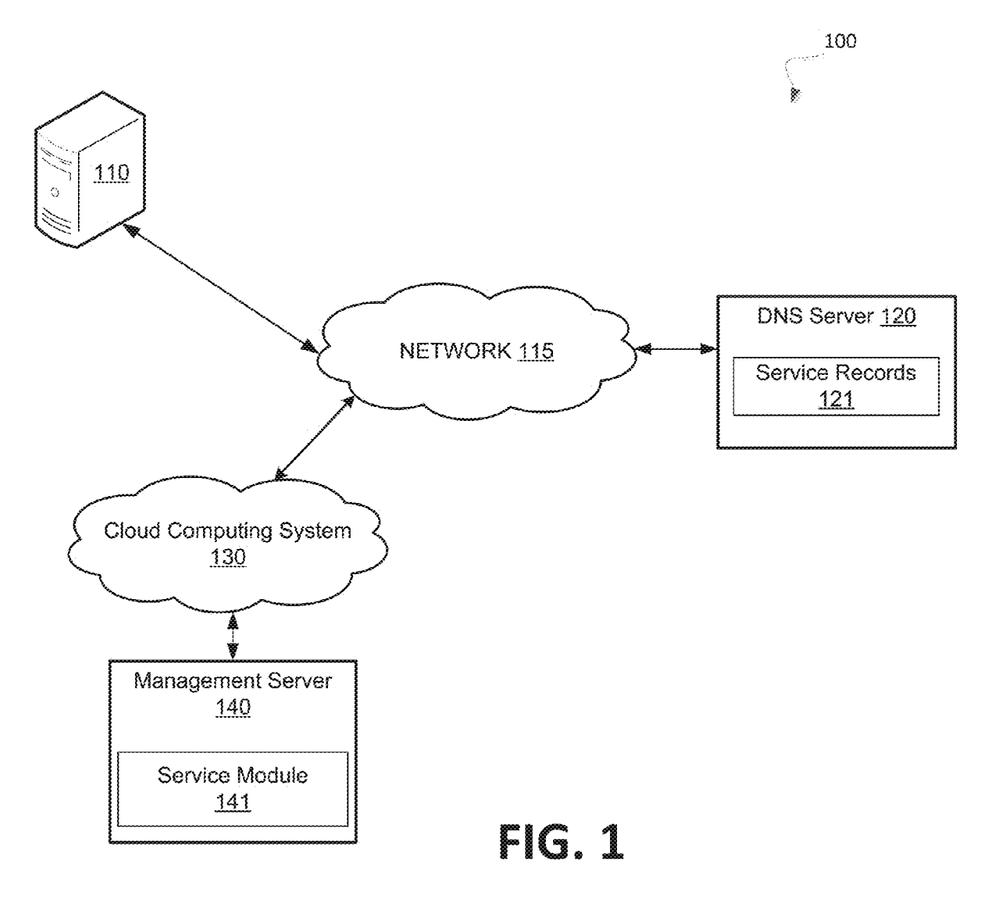
FIG. 1 illustrates an example system architecture in which embodiments of the disclosure may operate.

FIG. 1 is a block diagram of an embodiment of a system architecture 100 in which some embodiments of the present disclosure may operate. The system architecture 100 may include a cloud computing system 130 that includes servers coupled to client systems 110 over a network 115. Users may log in to the client systems to access the servers or other resources of the cloud computing system 130. For example, the users of the client system 110 may access one or more services (also referred to as network services) provided by one or more servers of the cloud computing system 130.

The client system 130 and servers of the cloud computing system may be a computing device such as a desktop computer or a laptop computer, or a portable computing device such as, but not limited to, mobile telephones, personal digital assistants (PDAs), portable media players, netbooks, tablet computers, portable gaming consoles, portable televisions, electronic book readers, and the like. The network 115 may be a private network (e.g., a local area network (LAN), a wide area network (WAN), intranet, etc.), a public network, a wireless network, a cellular network, or a combination thereof.

A cloud computing system 130 may allow multiple users from multiple client systems to access different components or resources of the cloud computing platform. The online infrastructure of the cloud computing platform may provide physical or virtual resources, such as access to physical or virtual servers or other such resources, to client systems that have requested a service provided by the cloud computing system. Examples of services provided by the online infrastructure may include, but are not limited to, access to data stored on storage devices, virtual machines, software services, physical servers, etc.

In some embodiments, a modified DNS server 120 may be used to relay user requests associated with a domain name of the cloud computing system to a management server 140 of the cloud computing system. For example, the client system 110 may transmit to the DNS server 120 a request to access a service associated with a domain name of the cloud computing system 130. The DNS server 120 may relay the request to access the service to the management server 140 which may identify network characteristics of the cloud computing system 130 to determine whether to provision a new resource to provide the service. The management server 140 may transmit back to the DNS server 120 the location of the new resource or to transmit either a location of an existing or current resource providing the service or an instruction for the DNS server 120 to continue with a round robin scheme to provide a location of a current resource to the client system 110 by using one of the service records 121 of the current resources.

The management server 140 may include a service module 141 to monitor and identify network characteristics of the cloud computing system 130. In some embodiments, the service module 141 may identify network characteristics of resources (e.g., physical servers, virtual servers, network bandwidth, CPU usage of physical or virtual servers, memory utilization of physical or virtual servers, etc.) that provide a service requested by a user of the client system 110 and relayed from the DNS server 120 to the management server 140. The service module 141 may determine whether a new resource to provide the service should be provisioned or whether an existing or current resource should be used to provide the service to the client system 110. If a new resource is provisioned, then the service records 121 of the DNS server 120 may be updated to include a service record for the new resource. However, if a new resource is not provisioned, then an existing resource may be selected from the service records 121.

As such, a client system may transmit a request to access a service associated with a domain name of a cloud computing system. The request may be transmitted to a modified DNS server to translate or obtain a location (e.g., IP address) of a resource at the domain name that provides the requested service. The modified DNS server may transmit the request from the client system to a management server of the cloud computing system. In some embodiments, network characteristics of current resources that currently provide the requested service at the cloud computing system may be identified and a new resource may be provisioned based on the network characteristics. If a new resource is provisioned, then service records of the DNS server may be updated to include a new service record for the location of the new resource and the location of the new resource may also be transmitted or relayed back to the client system. However, if a new resource is not provisioned, then the management server may instruct the DNS server to transmit or relay back to the client system a location of an existing resource that provides the service. For example, the DNS server may transmit or relay back to the user a location of a service that currently exists in the service records of the DNS server.

Figure 2:
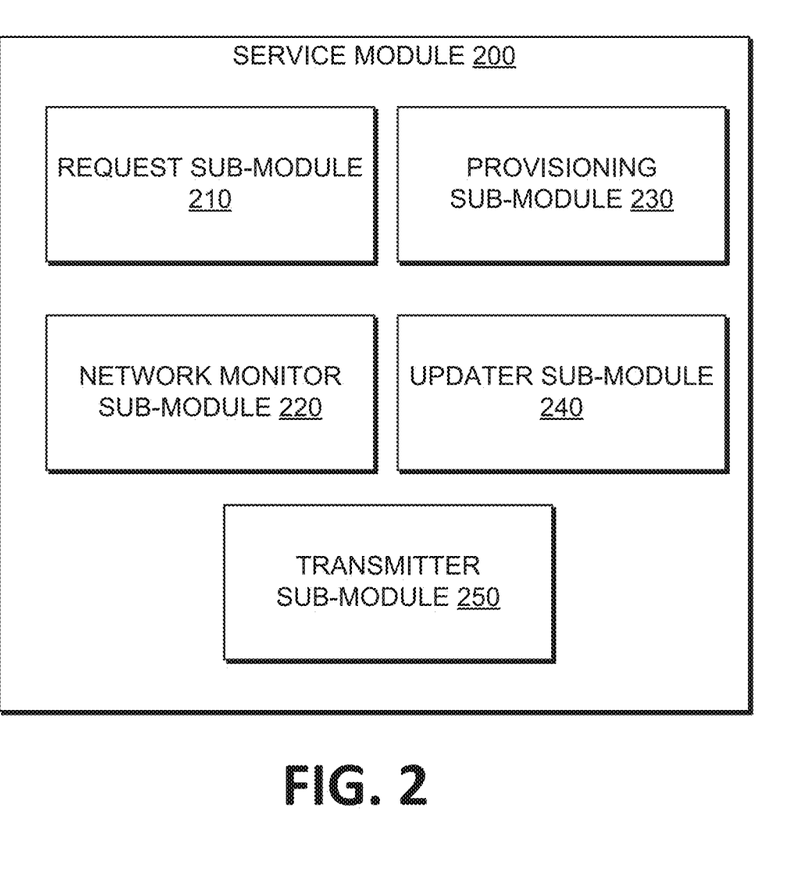
FIG. 2 illustrates an example service module in accordance with some embodiments of the disclosure.

FIG. 2 is a block diagram of an example service module 200 in accordance with some embodiments of the disclosure. In general, the service module 200 may correspond to the service module 141 of FIG. 1. The service module 200 may include a request sub-module 210, a network monitor sub-module 220, a provisioning sub-module 230, an updater sub-module 240, and a transmitter sub-module 250. In alternative embodiments, the functionality of one or more of the sub-modules may be combined or divided.

As shown, the service module 200 may include a request sub-module 210. In some embodiments, the request sub-module 210 may receive a user request from a DNS server. For example, a client system may transmit a request for a domain name and a service provided at the domain name to a DNS server and the DNS server may transmit or relay the request from the client system to the request sub-module 210. In some embodiments, such a DNS server may be considered to be a modified DNS server as the DNS server transmits or relays the request to the request sub-module 210 as opposed to immediately resolving or translating the request form the client system to a location (e.g., IP address).

The service module 200 may include a network monitor sub-module 220. In some embodiments, the network monitor sub-module 220 may identify network characteristics of a cloud computing system. For example, the network monitor sub-module 220 may identify one or more network characteristics of resources (e.g., physical servers, virtual servers, etc.) that provide a particular service at the cloud computing system. For example, the network monitor sub-module 220 may identify network characteristics of resources that provide the service of the request that is received by the request sub-module 210.

As shown in FIG. 2, the service module 200 may include a provisioning sub-module 230. In some embodiments, the provisioning sub-module 230 may provision a new resource (e.g., a physical server, virtual server, or any other network resource) based on the network characteristics monitored by the network monitor sub-module 220. In some embodiments, provisioning may be the process of preparing a resource, such as a physical or virtual server, with appropriate systems, data, and software, and make the resource available for network operation. For example, the provisioning of a resource may involve, but is not limited to, selecting a physical server or virtual server, loading appropriate software (e.g., operating system, device drivers, applications, etc.), customizing and configuring the resource, and configuring or changing any parameters such as an IP address of the resource.

The service module 200 may include an updater sub-module 240. In some embodiments, the updater sub-module 240 may update service records (e.g., service records 121) of a DNS server 120. For example, the updater sub-module 240 may update service records stored at a DNS server if the provisioning sub-module 230 provisions a new resource. In some embodiments, the updater sub-module may update the service records to include a new service record at the DNS server that identifies a new location for a resource that may provide a particular service at a domain name associated with the cloud computing system.

The service module 200 may further include a transmitter sub-module 250. In some embodiments, the transmitter module may transmit a location of a newly provisioned resource to a DNS server (e.g., DNS server 120). In the same or alternative embodiments, the service module 200 may transmit an instruction to the DNS server to use an existing service record to transmit or relay a location (e.g., IP address) of a current resource associated with a service requested by a client system.

Figure 3A:
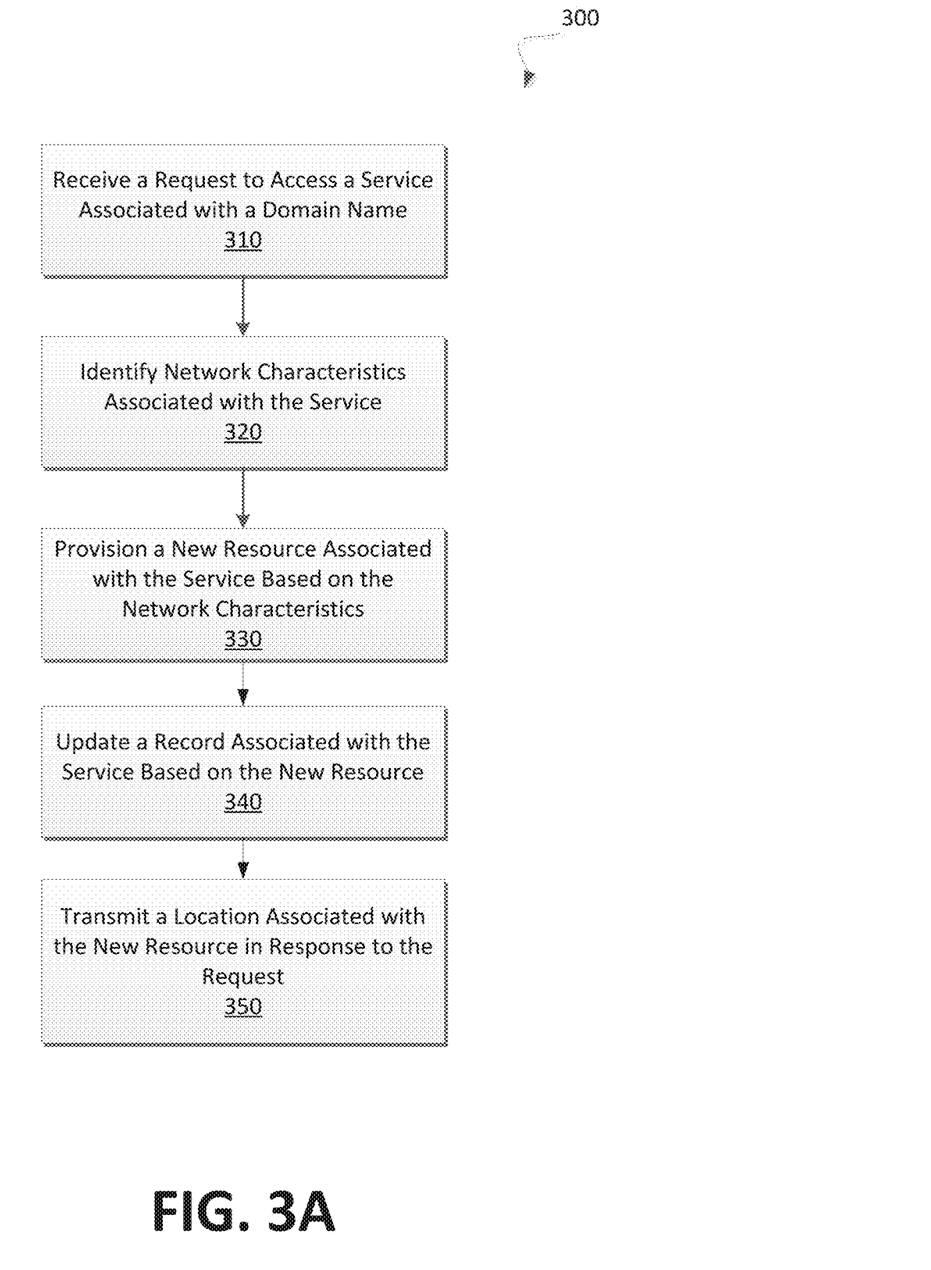
FIG. 3A is a flow diagram of an example method to transmit a location associated with a resource based on network characteristics in accordance with some embodiments.

FIG. 3A is a flow diagram of an example method 300 to transmit a location associated with an instance of a resource based on network characteristics. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a service module 141 or 200 of a management server associated with a cloud computing system.

As shown, the method 300 may begin by the processing logic receiving a request to access a service associated with a domain name (block 310). In some embodiments, the processing logic may receive the request from a DNS server that has transmitted or relayed the request from a client system. In the same or alternative embodiments, the request may be to access a service associated with a domain name of a cloud computing system. The processing logic may further identify network characteristics associated with the requested service (block 320). For example, the requested service may be provided by a single resource or multiple resources of a cloud computing system. Examples of network characteristics include, but are not limited to, a number of physical servers that provide a particular service, a number of virtual servers that provide a particular service, network bandwidth associated with servers that provide the service, central processing unit (CPU) usage of servers that provide the service, memory utilization of servers that provide the service, a number of user requests for the service, a number of active user connections to servers that provide the service, or any other characteristic or operating status of a network associated with servers or of the hardware resources of the servers. In some embodiments, the network characteristics may be identified for all resources of the cloud computing system instead of specifically the resources that provide the requested service. For example, total network bandwidth between all servers, CPU usage of all servers, memory utilization of all servers, etc. may be identified. As such, network characteristics of current resources of a cloud computing system may be identified. In some embodiments, the network characteristics of current resources that are used to provide a particular requested service may be identified or monitored in response to the request for the service. In the same or alternative embodiments, the network characteristics of all resources of the cloud computing system may be identified in response to the request for the service.

Returning to FIG. 3A, the processing logic may provision a new instance of a resource associated with the service based on the identified network characteristics (block 330). In some embodiments, a new resource may be provisioned if the network characteristics exceed a particular threshold level or does not satisfy a load policy. For example, a new resource may be provisioned if the identified network characteristics show a high level of activity relative to the capabilities of the existing or currently provisioned resources. As an example, if the current CPU usage of the services that currently provide the requested service are at 99% of capacity or usage, then a determination may be made to provision a new resource, such as another server, to provide the service for the requesting user of the client system. As such, the provisioning of the new resource may be based on a load policy associated with the characteristics of existing or current resources that provide a particular service that has been requested by a client system. In some embodiments, a load policy may define requirements or conditions of a cloud computing system that must be satisfied or met in order for a particular determination to be made or an action to be performed. For example, a load policy may define requirements associated with network characteristics of resources in a cloud computing device that determine whether a new resource will be provisioned or if a new resource will not be provisioned.

In some embodiments, the provisioning of a new resource to provide a service may be performed without receiving the user request. For example, the network characteristics may be continually monitored and if the current network characteristics of the existing or current resources exceeds a load policy threshold value, then a new instance of a resource may be provisioned to provide the service.

Returning to FIG. 3A, the processing logic may update a record associated with the service based on the provisioning of the new instance of the resource (block 340). For example, in response to the provisioning of the new resource to provide the service, a service record stored in a DNS server may be updated to include the location (e.g., IP address) of the newly provisioned resource that may provide a corresponding service to requesting users of client systems. Furthermore, the processing logic may transmit a location associated with the newly provisioned resource (block 350). For example, the location of the newly provisioned resource may be transmitted to a DNS server to be transmitted back or relayed to the user of the client system who made the original request to access a service associated with the domain name of the cloud computing system.

As such, a client system may transmit a request to access a service associated with a domain name. The request may be received by a modified DNS server that relays the request to a management server of a cloud computing system with the domain name of the request. Network characteristics of the cloud computing system may be identified. For example, network characteristics of resources that provide the requested type of service may be identified and a new resource to provide the requested type of service may be provisioned if the network characteristics of the resources that currently provide the type of service exceed or do not satisfy a load policy. In response to provisioning the new resource, service records of the modified DNS server may be updated to include the location of the new resource and the location of the new resource may be transmitted to the client system.

As an example, a cloud computing system may provide a first type of a service (e.g., a database) and a second type of a service (e.g., access to a file system). In some embodiments, a user may request to access the first type of the service and the network characteristics of the resources (e.g., servers) that provide the database service may be identified. If the network characteristics of the resources that provide the database service exceed a threshold value, then a new resource to provide a database service may be provisioned. If a subsequent user requests the second type of service corresponding to the access of a file system, then network characteristics of a separate set of resources that provide the second type of service may be identified and another resource to provide the second type of service may then be provisioned.

Figure 3B:
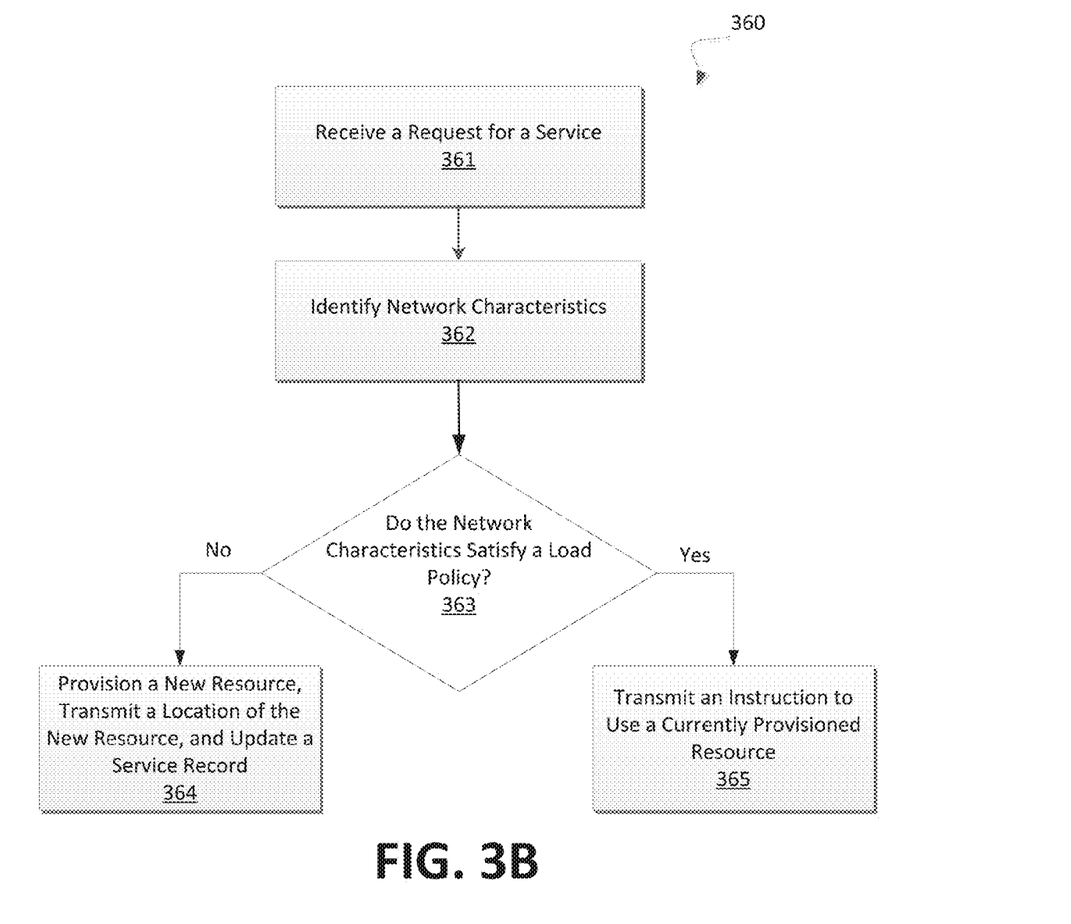
FIG. 3B is a flow diagram of an example method to transmit a location of either a newly provisioned resource or information associated with an existing resource based on network characteristics in accordance with some embodiments.

FIG. 3B is a flow diagram of an example method 360 to transmit a location of either a newly provisioned resource or information associated with a currently provisioned resource based on network characteristics. The method 360 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a service module 141 or 200 of a management server associated with a cloud computing system.

The method 360 may begin with the processing logic receiving a request for a service (block 361). For example, a request for a particular type of service provided by a cloud computing system may be received. The processing logic may identify network characteristics (block 362). For example, the processing logic may identify network characteristics of resources that provide the requested type of service at a cloud computing system. The processing logic may determine if the network characteristics satisfy a load policy (block 363). For example, the processing logic may determine if any of the network characteristics (e.g., current operating status) of resources used to provide the requested type of service exceed a threshold value or amount (e.g., a load policy). If the network characteristics of the resources of the cloud computing system do satisfy the load policy and thus do not exceed the threshold value, then the processing logic may transmit an instruction to use an existing or currently provisioned resource to provide the service to a client system making the request (block 365). For example, an instruction may be transmitted to a modified DNS server to use an existing service record stored at the DNS server to relay a location of an existing or currently provisioned resource to provide the service to the requesting client system. However, if the network characteristics do not satisfy a load policy, then the processing logic may provision a new resource to provide the service, transmit a location of the newly provisioned resource to the modified DNS server to relay back to the requesting client system, and may further update the service records stored at the DNS to include a new service record that comprises the location of the newly provisioned resource (block 364).

Figure 4:
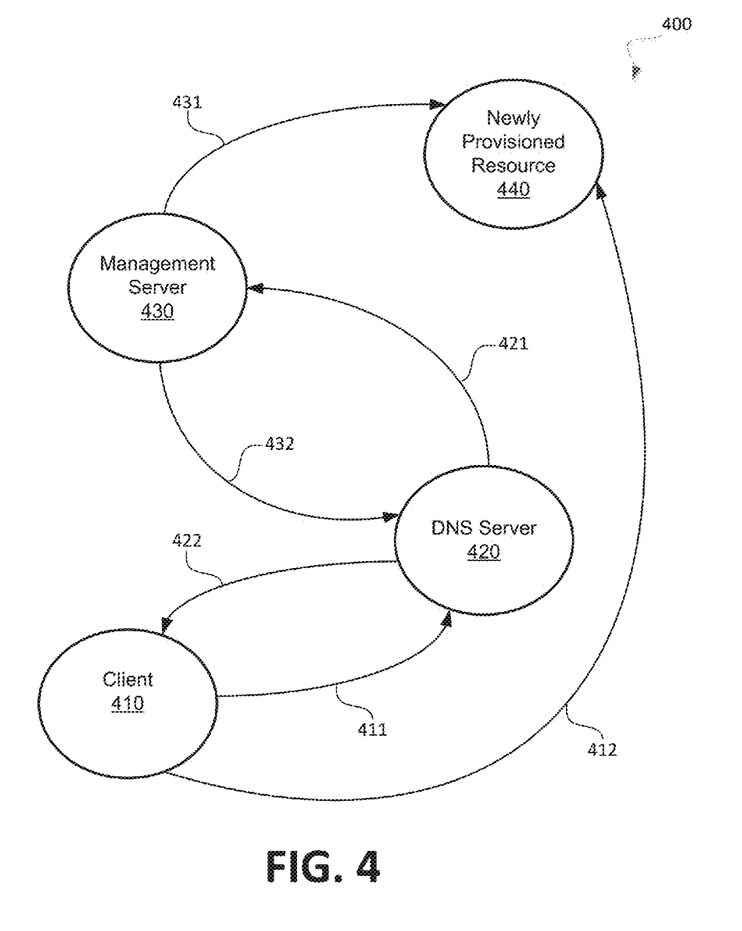
FIG. 4 is an example control flow using a service module and a modified DNS server in accordance with some embodiments of the disclosure.

FIG. 4 is an example control flow 400 using a service module and a modified DNS server in accordance with some embodiments of the disclosure. As shown, the control flow 400 may illustrate operations between a client system 410, DNS server 420, management server 430, and a newly provisioned resource 440. In some embodiments, the client system 410 may correspond to the client system 110, the DNS server 420 may correspond to the DNS server 120, the management server 430 may correspond to the management server 140, and the newly provisioned resource 440 may correspond to a newly provisioned resource of the cloud computing system 130.

As shown in FIG. 4, a client system 410 may transmit a request to access a service at a domain name (operation 411). The request may be received at the DNS server 420. In response to receiving the request, the DNS server 420 may transmit or relay the request from the client system 410 to the management server 430 (operation 421). In response to receiving the relayed request from the DNS server 420, the management server may provision a new resource 440 to provide the requested service (operation 431). In some embodiments, the newly provisioned resource 440 is provisioned or enabled based on network characteristics of existing or current resources that provide the requested service. After provisioning the newly provisioned resource 440, the management server 430 may inform the DNS server 420 of the newly provisioned resource 440 (operation 432). For example, the management server 430 may transmit to the DNS server information that identifies a location (e.g., IP address) of the newly provisioned resource and the type of service that the resource provides. The DNS server 420 may update a service record to store the location for the newly provisioned resource. Furthermore, the DNS server 420 may report or transmit the location of the newly provisioned resource to the client system 410 (operation 422). In response to receiving the location of the newly provisioned resource, the client system 110 may then connect to the newly provisioned resource 440 based on the received location to access the requested service (operation 412).

Figure 5:
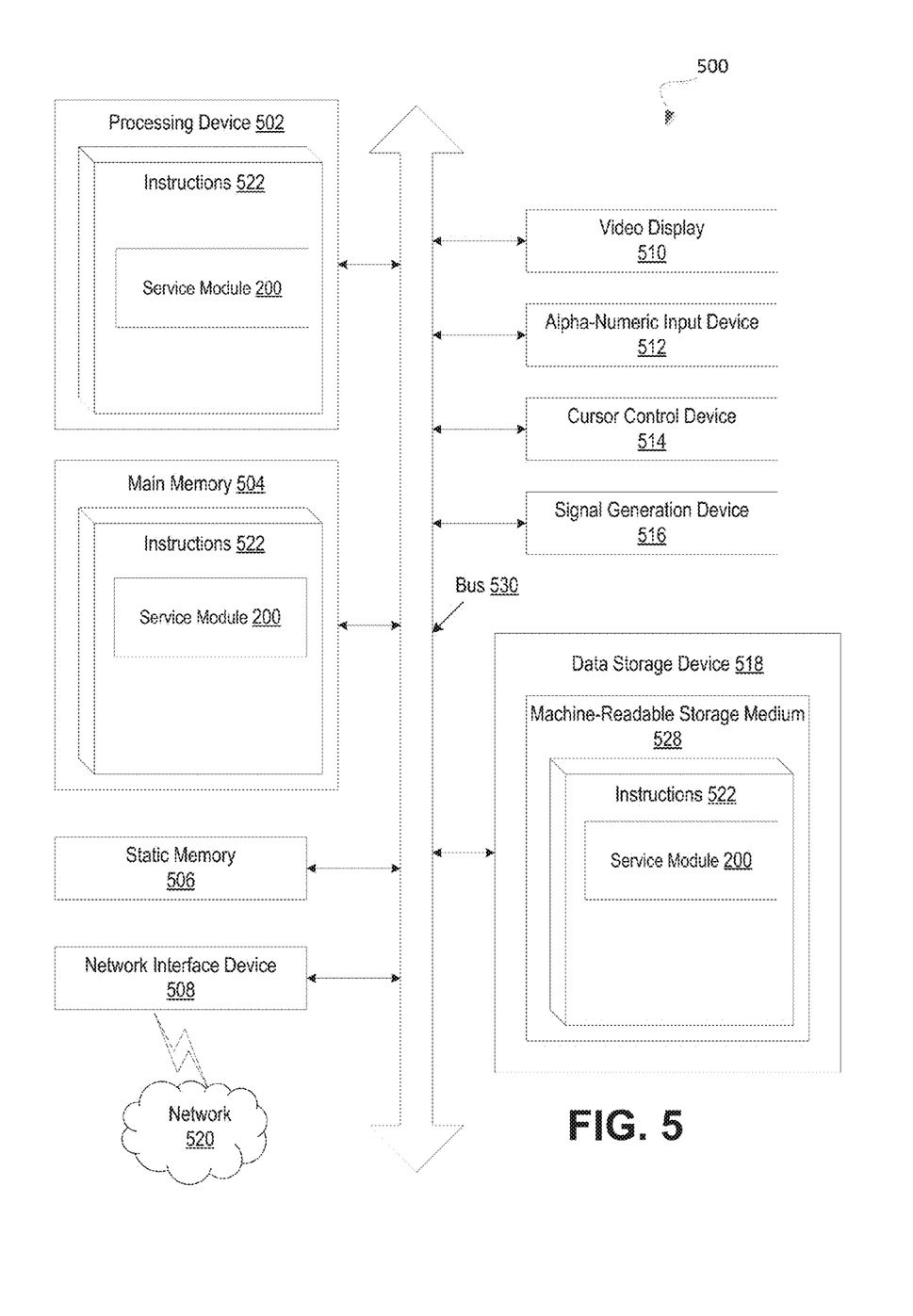
FIG. 5 illustrates a block diagram of an embodiment of a computer system in which some embodiments of the disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a service module (e.g., service module 141 of FIG. 1 and/or service module 200 of FIG. 2) and/or a software library containing methods that call modules or sub-modules in a service module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:
1. A method comprising:
receiving a request to access a network service;
identifying a network characteristic of current resources providing the network service;
determining whether the network characteristic of the current resources satisfies a load policy;
provisioning, by a processing device, a new resource to provide the network service in response to the network characteristic of the current resources not satisfying the load policy;
transmitting, to a server comprising records associated with the network service, a first location associated with the new resource in response to the network characteristic of the current resources not satisfying the load policy; and transmitting, to the server, an instruction to use an existing record at the server in response to the network characteristic of the current resources satisfying the load policy, the existing record being associated with one of the current resources that provides the network service.

2. The method of claim 1, wherein the server is a Domain Name Service (DNS) server.

3. The method of claim 1, wherein the server is a Domain Name Service (DNS) server, and the request to access the network service is received from the DNS server.

4. The method of claim 1, wherein the server is a Domain Name Service (DNS) server, the method further comprising:
updating a record of the DNS server to include the first location of the new resource in response to the network characteristic of the current resources not satisfying the load policy.

5. The method of claim 1, wherein the current resources comprise servers, and the network characteristic comprises a network load associated with the servers currently providing the network service.

6. The method of claim 1, wherein instruction to use the existing record at the server corresponds to a round robin scheme to select the existing record from a plurality of existing records at the server.

7. The method of claim 1, wherein the instruction to use the existing record at the server corresponds to relaying a location of one of the current resources identified from the existing record.

8. The method of claim 2, wherein the existing record is a service record that comprises a second location corresponding to the one of the current resources.

9. A system comprising:
a memory to store information associated with a load policy; and
a processing device operatively coupled with the memory, to:
receive a request to access a network service;
identify a network characteristic of current resources providing the network service;
determine whether the network characteristic of the current resources satisfies the load policy;
provision a new resource to provide the network service in response to the network characteristic of the current resources not satisfying the load policy;
transmit, to a server comprising records associated with the network service, a first location associated with the new resource in response to the network characteristic of the current resources not satisfying the load policy; and
transmit, to the server, an instruction to use an existing record at the server in response to the network characteristic of the current resources satisfying the load policy, the existing record being associated with one of the current resources that provides the network service.

10. The system of claim 9, wherein the server is a Domain Name Service (DNS) server.

11. The system of claim 9, wherein the server is a Domain Name Service (DNS) server, and the request to access the network service is received from the DNS server.

12. The system of claim 9, wherein the server is a Domain Name Service (DNS) server, and the processing device is further to:
update a record of the DNS server to include the first location of the new resource in response to the network characteristic of the current resources not satisfying the load policy.

13. The system of claim 9, wherein the current resources comprise servers, and the network characteristic comprises a network load associated with the servers currently providing the network service.

14. The system of claim 10, wherein the existing record is a service record that comprises a second location corresponding to the one of the current resource.

15. A non-transitory machine-readable storage medium comprising data that, when accessed by a processing device, cause the processing device to:
receive a request to access a network service;
identify a network characteristic of current resources providing the network service;
determine whether the network characteristic of the current resources satisfies a load policy;
provision, by the processing device, a new resource to provide the network service in response to the network characteristic of the current resources not satisfying the load policy;
transmit, to a server comprising records associated with the network service, a first location associated with the new resource in response to the network characteristic of the current resources not satisfying the load policy; and
transmit, to the server, an instruction to use an existing record at the server in response to the network characteristic of the current resources satisfying the load policy, the existing record being associated with one of the current resources that provides the network service.

16. The non-transitory machine-readable storage medium of claim 15, wherein the server is a Domain Name Service (DNS) server.

17. The non-transitory machine-readable storage medium of claim 15, wherein the server is a Domain Name Service (DNS) server, and the request to access the network service is received from the DNS server.

18. The non-transitory machine-readable storage medium of claim 15, wherein the server is a Domain Name Service (DNS) server, the processing device is further to:
update a record of the DNS server to include the first location of the new resource in response to the network characteristic of the current resources does not satisfy the load policy.

19. The non-transitory machine-readable storage medium of claim 16, wherein the existing record is a service record that comprises a second location corresponding to the one of the current resources.

* * * * *